(12) United States Patent
Plain et al.

(10) Patent No.: US 6,532,314 B1
(45) Date of Patent: Mar. 11, 2003

(54) TALKING TOY SCANNER

(75) Inventors: Barbara Plain, Des Plaines, IL (US); Tirza Ernst, Highland Park, IL (US); Samuel Nguy, Hong Kong (HK)

(73) Assignee: Learning Resources, Inc., Vernon Hills, IL (US)

( * ) Notice: Subject to any disclaimer, the term of this patent is extended or adjusted under 35 U.S.C. 154(b) by 0 days.

(21) Appl. No.: 09/493,971

(22) Filed: Jan. 28, 2000

(51) Int. Cl.[7] .................................................. G06K 9/20
(52) U.S. Cl. .......................... 382/312; 235/1 E; 446/483
(58) Field of Search ................................ 382/312, 313, 382/314, 316, 318, 319, 221, 322, 323, 324; 446/8, 129, 130, 143, 380, 479, 483, 484, 485, 489, 491; 235/1 E, 7 R, 375, 435, 440, 454, 462.01–462.14, 462.25, 462.34, 462.38, 462.41–462.45, 462.47, 462.49, 472.01, 472.03, 486, 487, 494; 434/110, 393; 463/36, 46

(56) References Cited

U.S. PATENT DOCUMENTS

| | | | | |
|---|---|---|---|---|
| 4,282,674 A | * | 8/1981 | Hanson et al. ............... | 446/143 |
| 4,307,534 A | * | 12/1981 | Tomita ........................ | 446/143 |
| 4,959,017 A | * | 9/1990 | Thompson et al. .......... | 434/110 |
| 4,973,287 A | * | 11/1990 | Martin ........................ | 446/479 |
| 5,212,368 A | * | 5/1993 | Hara ........................... | 237/375 |
| 5,314,336 A | * | 5/1994 | Diamond et al. ........... | 434/169 |
| 5,476,407 A | * | 12/1995 | Hall, Jr. ...................... | 446/397 |
| 5,959,281 A | * | 9/1999 | Domiteaux ................. | 235/454 |

OTHER PUBLICATIONS

Copy of Pat & Fred Industrial Co., Ltd Item No. 9618 Scanner Cash Register Package.
Copy of Voice'N Sound Smart Cash Register Package.

* cited by examiner

*Primary Examiner*—Jose L. Couso
(74) *Attorney, Agent, or Firm*—Larry L. Saret; Michael Best & Friedrich LLC

(57) ABSTRACT

A toy scanner is disclosed capable of scanning printed price indicators and audibly and visually displaying the scanned price. The price indicators are printed in carbon ink and the toy scanner includes a conductive rubber strip located on the reading face of the scanner for reading the carbon ink printed price indicators. The scanned price is visually displayed on an LCD display. The scanned price is audibly displayed by a voice synthesizer and loud speaker combination which "talks" the scanned price. A mute switch is included for turning off the talk feature. The scanner also includes a random number generator for generating a random price, which is also audibly and visually displayed, upon activation of a random price activation switch.

5 Claims, 4 Drawing Sheets

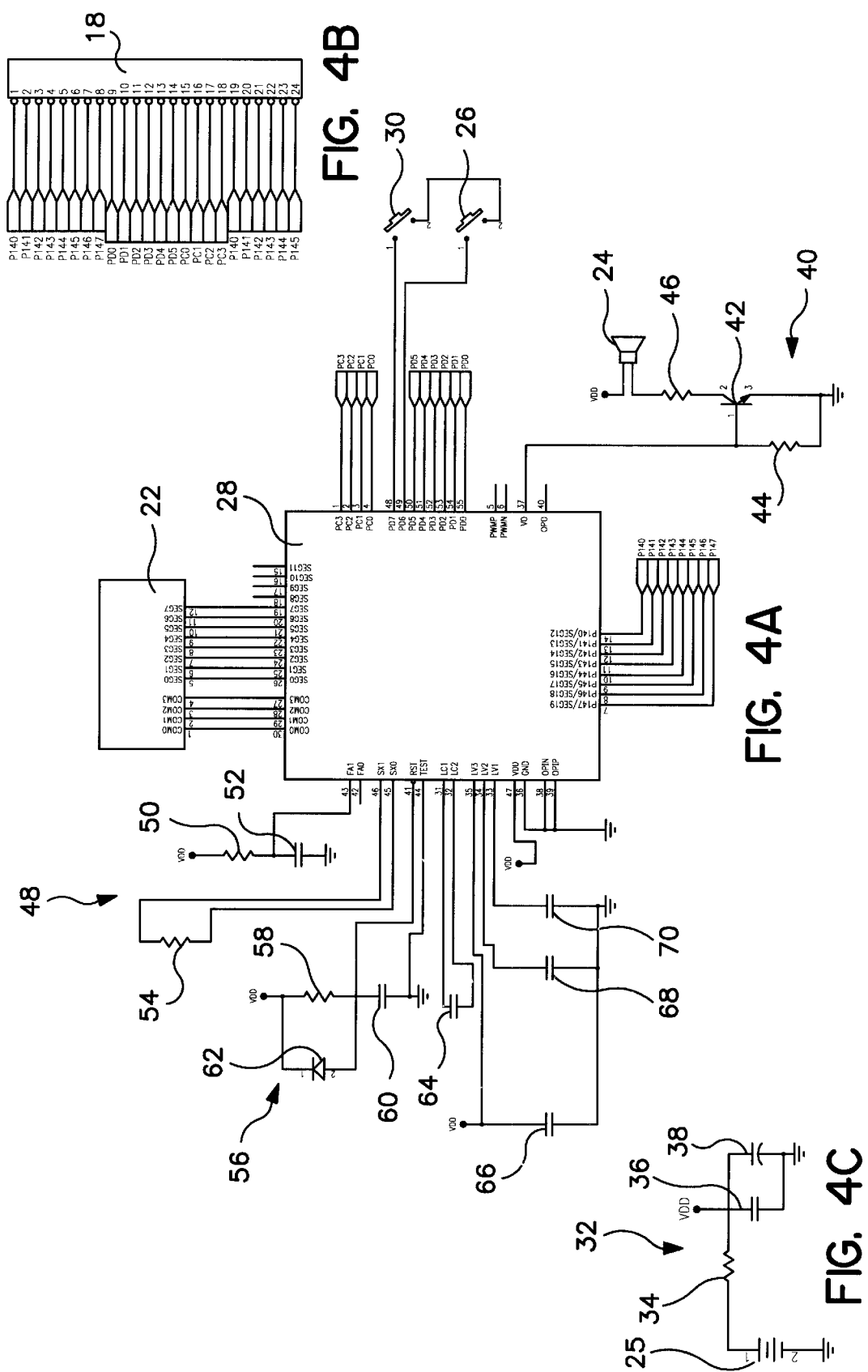

TALKING TOY SCANNER

FIELD OF THE INVENTION

The present invention relates to children's toys. More particularly, the present invention relates to a talking toy scanner capable of reading carbon ink price indicators and audibly and visually indicating the scanned price.

BACKGROUND OF THE INVENTION

Prior art toy scanners typically come attached to toy cash registers as opposed to being separate units. Often times these prior art toy scanners do not actually scan anything. Instead, they merely make beeping sounds and light up but do not display an actual scanned price.

In systems where the toy scanner actually scans a bar code price indicator, a price value may be displayed on the attached cash register. However, these systems do not audibly indicate the price scanned, so the child must be capable of reading the displayed price in order to obtain play value. Further, these systems generally must include special metal probes on the scanner that read magnetic strips on bar code price indicators specifically configured to work with these toy scanner systems.

It would be advantageous to provide a separate hand-held toy scanner capable of reading a carbon ink printed price indicator and audibly and visually indicating the scanned price. This would provide a more realistic play experience by simulating the way real price scanners work, and reinforce money and shopping skills.

SUMMARY OF THE INVENTION

In accordance with the present invention, a talking toy scanner comprises a processor for controlling operation of the toy scanner, a conductive rubber strip operatively connected to the processor for scanning printed price indicators, a sound generator for audibly displaying the price associated with the scanned price indicator and a display for visually displaying the price associated with the scanned price indicator. In one embodiment, the printed price indicator is printed in carbon ink.

The toy scanner can include a random price generator for generating a random price. Upon generation of the random price the sound generator and display are configured to display the random price. A random price switch can also be included for activating the random price generator and a mute switch for deactivating the sound generator.

Further objects, features and advantages of the present invention will become apparent from the following description and drawings.

BRIEF DESCRIPTION OF THE DRAWINGS

FIG. 4A is a schematic block diagram of the electronics of the toy scanner of FIG. 1;

FIG. 4B is a schematic block diagram of the conductive rubber strip of the toy scanner of FIG. 1; and FIG. 4C is a schematic block diagram of the power supply electronics of the toy scanner of FIG. 1.

DETAILED DESCRIPTION OF THE PREFERRED EMBODIMENT

In accordance with the present invention, a toy scanner is described that provides distinct advantages when compared to those of the prior art. The invention can best be understood with reference to the accompanying drawing figures.

Figure 1:
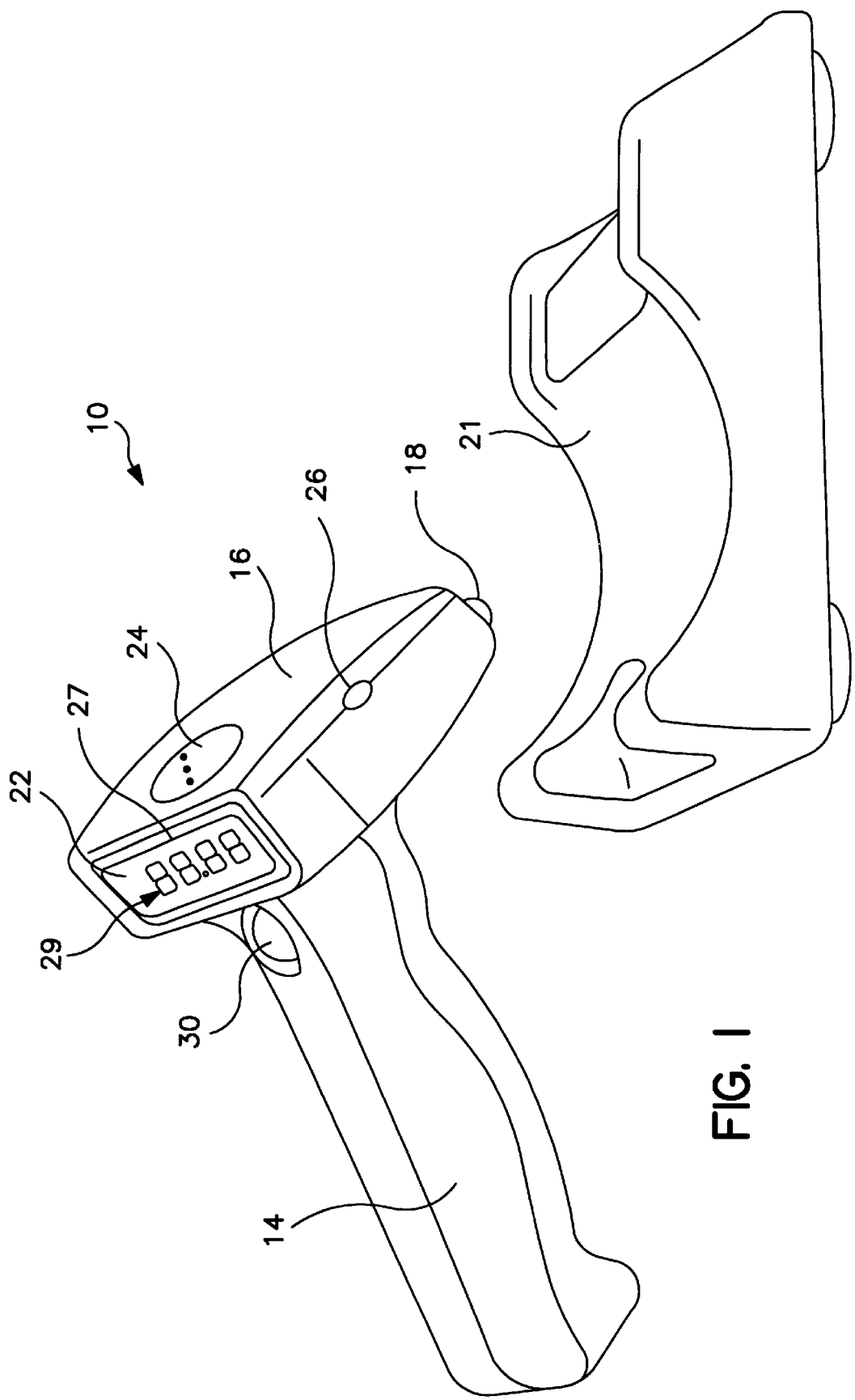
FIG. 1 is a perspective view of a toy scanner and holding stand according to the present invention.
Figure 2:
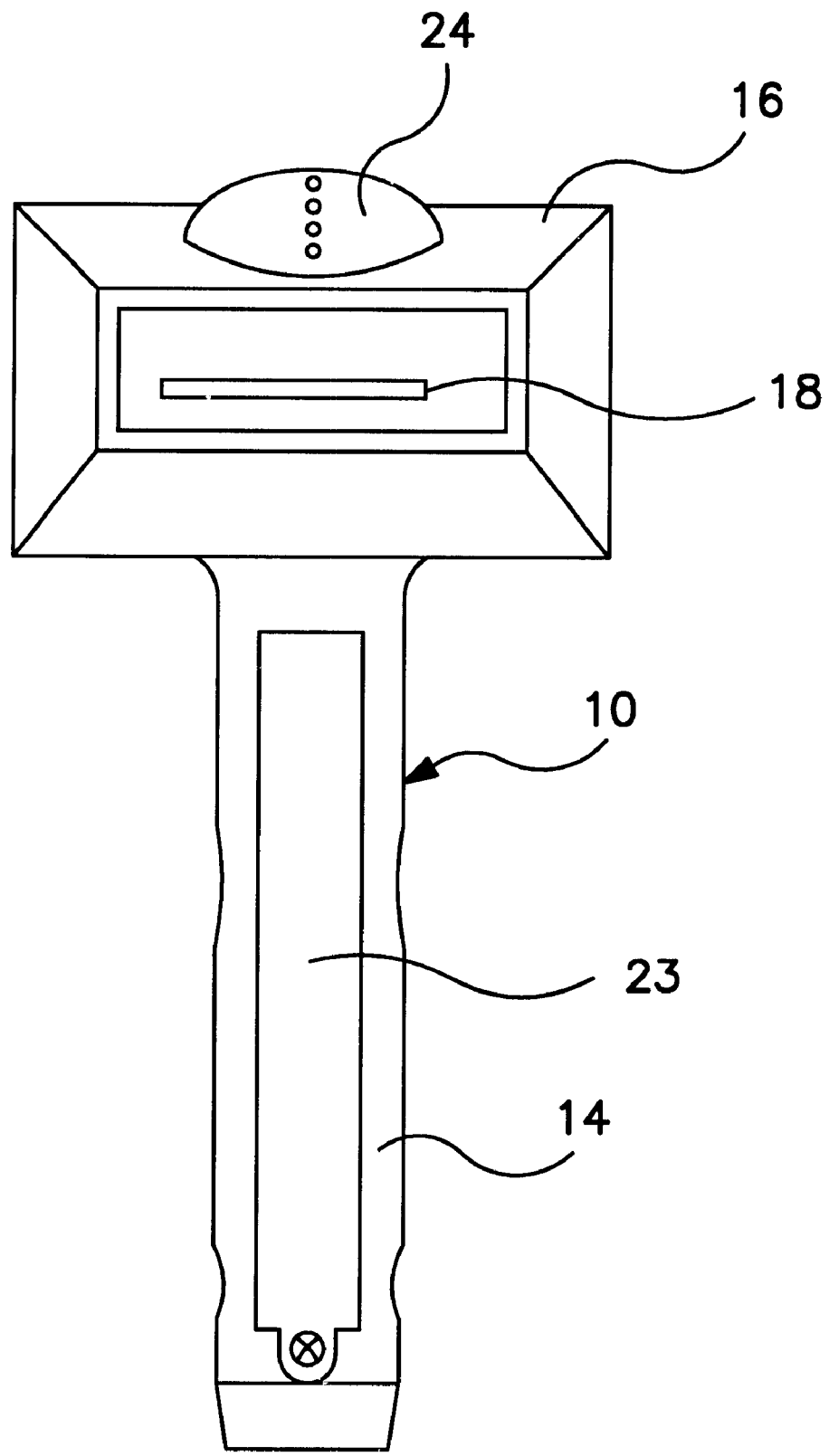
FIG. 2 is a front view of the toy scanner of FIG. 1.
Figure 3:
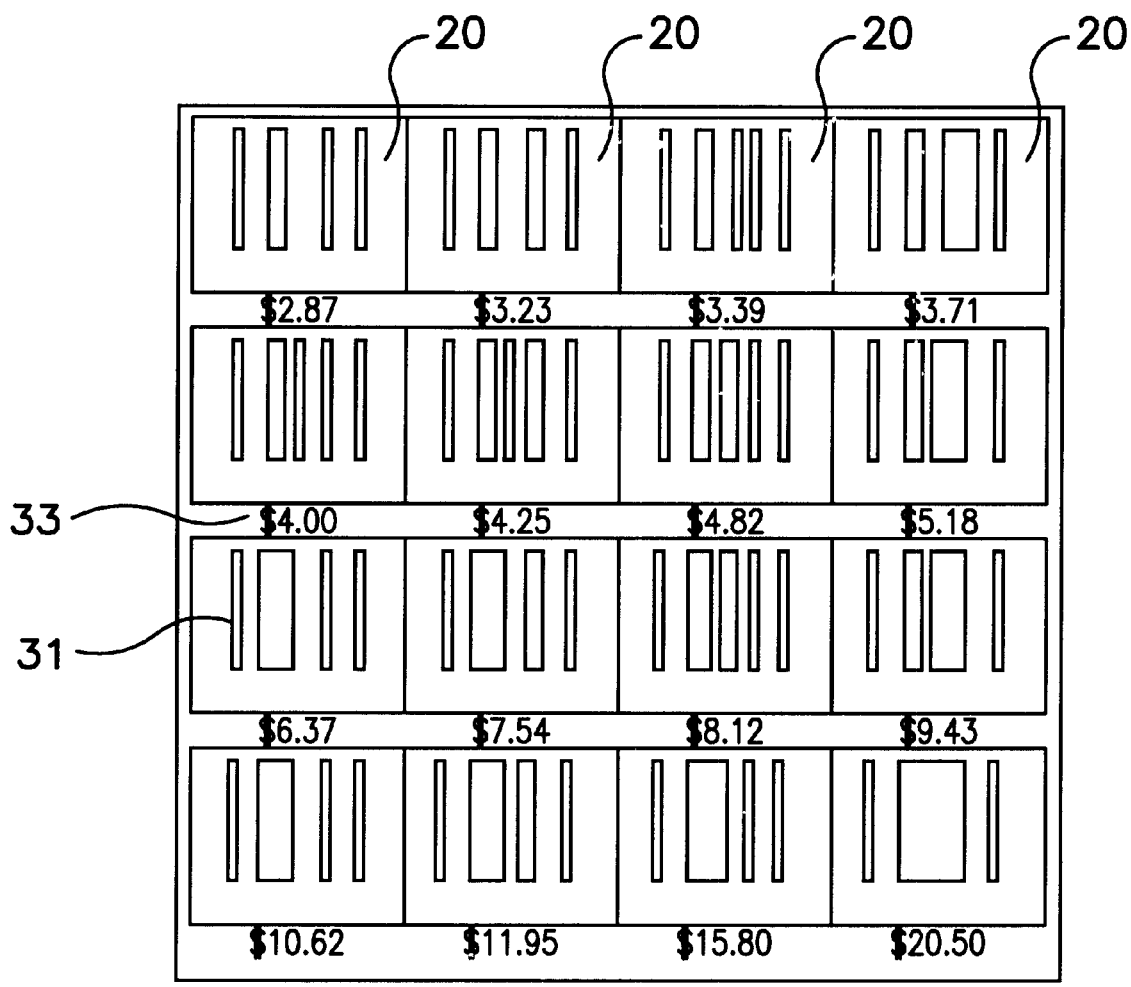
FIG. 3 is a diagrammatical view of price indicators according to the present invention.

Referring now to the FIGS. 1 and 2, a toy scanner 10 according to the present invention includes a stand-alone, hand-held scanning wand 10 having a handle 14 and a head 16. A conductive rubber strip 18, such as zebra strip model number YL0118P sold by Li Seng Technology Limited, is included on the head 16 for scanning bar code price indicators 20 (FIG. 3) printed in carbon ink.

The scanning wand 10 is a separate stand-alone toy such that it is not mechanically or electronically attached to a toy cash register or the like. Preferably, the scanning wand 10 includes a battery compartment 23 for holding a portable power source such as a battery 25 (FIG. 4C). A holding stand 21 can also be included for holding the hand-held scanning wand 10 when it is not in use.

The toy scanner 10 also includes a display 22, such as an LCD, for visually displaying the price associated with a scanned price indicator 20 (FIG. 3), as well as a sound generator, such as a voice synthesizer and loud speaker 24, for audibly presenting the price associated with the scanned price indicator 20. A mute switch 26 can be included on the toy scanner 10 for deactivating the sound generator, thus muting the audio presentation of scanned price. Preferably, the display 22 includes a price value indicator 27 (shown as $88.88 in FIG. 1) for displaying the scanned price and a sound icon 29 for indicating whether the sound generator is activated or deactivated.

In a preferred embodiment, the voice synthesizer is part of a microprocessor 28 (FIG. 4A) that controls operation of the toy scanner 10. The microprocessor 28 can also include a random price generator for generating a random price value, which can be displayed by the toy scanner 10. The random price generator is activated by a random price switch 30 on the toy scanner 10.

Referring now to FIGS. 4A, 4B and 4C, the operational electronics of the toy scanner 10 are shown in schematic form. Microprocessor 28 is configured to control operation of the toy scanner 10. Operational software, such as control software, random price generation software and voice synthesizing software, is stored in the microprocessor 28 and is run for performing specific microprocessor tasks. In one embodiment, the microprocessor 28 comprises an 8-bit microprocessor control unit and LCD driver such as HEC model HE83115 microprocessor and the LCD display 22 comprises a conventional 7-segment display such VIKAY LcD-V62634 (EQ 2158). However, other types, makes and models of microprocessor and LCD display can be used without departing from the spirit and scope of the invention as set forth in the appended claims.

The conductive rubber strip 18, LCD display 22, loud speaker 24 and mute 26 and random price generator switches 30 are electrically connected to microprocessor 28. The conductive rubber strip 18 is connected to the microprocessor 28 via input lines P140–P147, PD0–PD5 and PC0–PC3. The LCD display 22 is connected to the microprocessor 28 via communication lines SEG0–SEG7 and COM0–COM3. The loud speaker 24 is connected to output line VO of the microprocessor 28. The mute 26 and random price generator switches 30 are connected to input lines PD7 and PD6 of the microprocessor 28, respectively.

A power supply circuit 32 is included for regulating the power supplied to the toy scanner electronics by the battery 25 and protecting the electronics from overcurrent situations. In one embodiment, the power supply circuit 32 includes a resistor 34 and two capacitors 36 and 38 connected in parallel. Preferably, the battery 25 comprises a 3-volt battery, resistor 34 comprises a 1Ω, ¼ watt resistor, capacitor 36 comprises a 0.1 μf, 50 volt capacitor, and capacitor 38 comprises a 220 μf, 18 volt capacitor. However, other conventional power supply circuits can be used without departing from the spirit and scope of the invention as set forth in the appended claims.

A speaker driver circuit 40 is included for driving loud speaker 24. In one embodiment, the speaker driver circuit 40 comprises a conventional transistor 42 biased by two resistors 44 and 46. Preferably, transistor 42 comprises a SAMSUNG model 8050 C transistor, resistor 44 comprises a 5.6Ω, ¼ watt resistor, resistor 46 comprises a 5.6Ω, ¼ watt resistor, and loud speaker 24 comprises an 8Ω loud speaker. However, other convention speaker driver circuits can be used without departing from the spirit and scope of the invention as set forth in the appended claims.

Additional microprocessor control circuitry 48 is also included for controlling operation of the microprocessor 28. For example, power is connected to the FX1 input of the microprocessor 28 through a 6.2 kΩ resistor 50 and 25 pf capacitor 52 for providing a fast system clock. A 200 kΩ resistor 54 is connected between inputs SX0 and SX1 for providing a slow system clock. Test and reset functions are provided by supplying power to the RST and TEST inputs through a test/reset circuit 56 comprising a 10 kΩ resistor 58, a 10 μf, 16 volt capacitor 60 and a diode 62. Capacitor 64, connected between inputs LC1 and LC2, capacitors 66, 68 and 70, connected to inputs LV1–LV3, act as charging capacitors for LCD display 22. In one embodiment, capacitors 64, 66, 68 and 70 comprise 0.1 μf, 50 volt capacitors, with power being supplied to LV1–LV3 through capacitors 66, 68, and 70. Microprocessor input VDD is connected to the battery 25 through the power supply circuit 32 and input GND and unused inputs OPIN and OPIP are connected to ground. While specific microprocessor control circuitry is described above, it can be appreciated that alternative conventional circuitry can be used without departing from the spirit and scope of the invention as set forth in the appended claims.

The price indicators 20(FIG. 3) are preferably printed with carbon ink in a bar code format 31 to simulate conventional skipped numbers, such as Arabic numerals 33, so that the user can visually read the prices.

In operation, the conductive rubber strip 18 senses and scans the carbon ink printed price indicators 20 when pressed on the price indicators 20. Electro-magnetic signals, indicative of the scanned price indicator 20, are generated by and passed from the conductive rubber strip 18 to the microprocessor 28. The carbon ink creates an electrical potential across the conductive rubber strip when the conductive rubber strip is pressed on the printed price indicator. This electrical potential is picked up by the data lines connecting the conductive rubber strip to the microprocessor. The data lines directly adjacent to the carbon ink are turned or carry a "high" electrical potential to the microprocessor while data lines that are not directly adjacent to the carbon ink remain "off" or carry a "low" electrical potential to the microprocessor. The configuration of the printed price indicator can be determined by the pattern of "high" and "low" potentials carried to the microprocessor by the data lines. The microprocessor 28 sends the price information to the LCD display 22, which visually displays the price information. Assuming the sound generator is activated (i.e. the mute switch 26 is not closed), the voice synthesizer of the microprocessor 28 generates an audio signal corresponding to the price associated with the scanned price indicator 20 and sends the audio signal to the loud speaker 24, which audibly announces the price information. Alternatively, upon activation of the random price generator switch 30, the random price generator of the microprocessor 28 generates random price information, which is displayed visually on the LCD display 22 and announced audibly from the loud speaker 24 in the same manner as price information input through the conductive rubber strip 18.

With this invention, a child can play in a manner that closely simulates a real shopping experience. The invention teaches even very young children that bar codes express price information, so that when the children visit stores, they can understand the check-out and payment process. The invention also reinforces the idea that products bearing bar codes cost money.

It will be apparent to those skilled in the art that modifications may be made without departing from the spirit and scope of the invention. Accordingly, it is not intended that the invention be limited except as may be necessary in view of the appended claims.

What is claimed is:

1. A toy scanner for scanning a printed price indicator and displaying a price associated with the scanned price indicator, the toy scanner comprising:

a microprocessor for controlling operation of the toy scanner;

a conductive rubber strip operatively connected to the processor for scanning the printed price indicator;

a sound generator for audibly displaying the price associated with the scanned price indicator;

a display for visually displaying the price associated with the scanned price indicator;

wherein said printed price indicator is printed in carbon ink.

2. The toy scanner of claim 1 further comprising a random price generator for generating a random price wherein said upon generation of said random price said sound generator and said display displays said random price.

3. The toy scanner of claim 2 further comprising a random price switch for activating said random price generator.

4. The toy scanner of claim 1 further comprising a mute switch for deactivating said sound generator.

5. The toy scanner of claim 1 further comprising a holding stand configured for holding the toy scanner when it is not in use.

\* \* \* \* \*